Patented Oct. 29, 1940

2,219,862

UNITED STATES PATENT OFFICE 2,219,862

POLYMERIZATION OF DRYING OILS

Theodore F. Bradley, Stamford, and William B. Johnston, Springdale, Conn., assignors to American Cyanamid Company, New York, N. Y., a corporation of Maine No Drawing. Application November 10, 1938, Serial No. 239,842

11 Claims. (Cl. 260—407)

This invention relates to the polymerization of drying and semi-drying oils such as linseed oil, perilla oil, soya bean oil, tung oil and synthetic drying oils such as the glycerides of octa-decadiene-9,11-acid-1 and to improved products prepared from such oils such as varnishes, enamels, lithographing inks, oilcloth, linoleum and the like.

In preparing drying oils for the manufacture of the above and similar products it is customary and frequently necessary to thicken or polymerize the oil by thermal treatment. This step is referred to as "bodying" and the thickened or polymerized oils are referred to as "kettle bodied" oils. It is an object of the present invention to accelerate this thickening process so that bodied varnish, lithographic and similar oils can be obtained in a fraction of the time normally required. It is a further object of the invention to carry out the bodying of these and similar oils without discoloring or otherwise impairing the properties of the oil. Another object is the provision of drying or semi-drying oils having improved bodying properties. A still further object of the invention is to provide new and improved kettle bodied oils having a lighter color and lower acid number than those that have been produced by other processes.

In the kettle bodying of drying oils it has been proposed to include a number of accelerators or catalysts to shorten the bodying time. Such substances as metallic oxides, sulfur, selenium, sulfur dioxide, sulfur chloride, benzidine and the like have been proposed for this purpose. Experience has shown, however, that relatively large amounts of these substances on the order of 1-10% must be used to obtain any substantial reduction in the bodying time, and these large quantities invariably cause serious discoloration of the oils. In many cases this discoloration is accompanied by partial decomposition of the oil and a resulting product of high acid number.

We have found that the aromatic mercaptans or thiophenols are excellent polymerization accelerators or catalysts for the heat bodying of drying oils such as linseed oil, perilla oil, soya bean oil, tung oil, dehydroxylated castor oils and the like, and that polymerization can be obtained in the presence of such small quantities of these substances that appreciable discoloration and decomposition is substantially eliminated. When this class of polymerization accelerators is used the time of heat treatment is so shortened as to minimize the splitting of the glycerides and other objectionable side reactions during polymerization of the oil, and products having a much lower acid number, better color and better drying and film forming characteristics are obtained.

We have found that beta-naphthol mercaptan, $C_{10}H_7SH$, is a particularly advantageous accelerator or catalyst for the polymerization of drying and semi-drying oils. The necessary bodying can be obtained with amounts of from 0.01% to 0.5% or more of this material in at least half the normal bodying time required for such oils when no catalyst is used and without increase in the bodying temperature. As is shown by the following examples, the use of beta-naphthol mercaptan in concentrations higher than 0.5% by weight may lead to irregular results when this catalyst is used alone. We have also found, however, that the results obtainable from the action of larger amounts of other catalysts can be improved by the use of beta-naphthol mercaptan in admixture therewith: that is to say, by the use of 0.5% or less of beta-naphthol mercaptan in conjunction with small amounts of sulfur, benzoyl peroxide, metallic oxides, sulfur chloride or other known accelerators. These known accelerators appear to promote or modify the catalytic action of the beta-naphthol mercaptan as a polymerization accelerator for drying and semi-drying oils, and their use in conjunction therewith constitutes another feature of the invention.

The temperature range at which drying or semi-drying oils containing beta-naphthol mercaptan should be bodied in accordance with the present invention is not substantially different from the range now employed in commercial practice; that is to say, the ordinary polymerizing temperatures of 220° C. to 320° C. are most favorable. As stated above, we have found that the presence of this mercaptan in the oils will result in a material shortening of the bodying time at these temperatures, and that the time required to reach any given stage of polymerization, as determined by viscosity, iodine number, molecular weight, density or refractive index, will range from ¼ to ½ the time required at the same temperature when no catalyst is used.

While we have found that beta-naphthol mercaptan will produce the greatest improvements in the polymerization of drying oils, we have also found that other aromatic and aliphatic mercaptans and disulfides are similar in action. Amides and esters of aromatic and aliphatic sulfonic acids and aldehyde-bisulfite condensation products are also good polymerization accelerators, but so far we have found none that are more efficient than the naphthol mercaptans when judged by their effect on the color of the finished oils. It should be understood, therefore, that beta-naphthol mercaptan constitutes the preferred polymerization accelerator or catalyst for drying oils in accordance with the present invention.

From the foregoing it will be seen that the present invention provides a relatively simple method for the kettle bodying of drying or semi-drying oils, simply by incorporating beta-naphthol mercaptan therein. Since this mercaptan can be easily dissolved in all drying and semi-drying oils in amounts of 0.01% to 0.5%, based on the weight of the oil, it is evident that one convenient method of commercializing the invention is to incorporate the polymerization accelerator in the oils at the time of their manufacture. It should be understood, therefore, that the present invention includes not only an improved polymerization method for drying and semi-drying oils, but also new oils of this class having improved kettle bodying properties, these oils being characterized by a content of 0.01% to 0.5% of beta-naphthol mercaptan.

The invention will be illustrated in greater detail by the following specific examples, to which, however, it is not limited. On the contrary, these examples are given to show the remarkable improvements produced upon bodying representative drying and semi-drying oils with the aid of the polymerization catalysts of the present invention, and are therefore to be regarded as illustrative only.

Example 1

Samples of alkali refined linseed oil were warmed in an oil bath and 0.1% by weight of the following polymerization accelerator, based on the weight of the oil were dissolved therein. One sample was retained as a blank, with no addition of accelerator. The bath temperature was then raised to 300° C. in 30 minutes and held at 295–300° C. for 2½ hours. The oils upon cooling to room temperature had the following characteristics:

| Sample | Viscosity at 25° C. poises | Color Gardner-Holdt standards |
|---|---|---|
| Linseed oil alone | 1.40 | 8 |
| Linseed oil+0.1% beta-naphthyl mercaptan | 3.40 | 9 |
| Linseed oil+0.1% thio-paracresol | 3.00 | 9 |
| Linseed oil+0.1% thiosalicylic acid | 3.20 | 10 |

Similar test runs with 1% and 5% of beta-naphthyl mercaptan showed that inferior results are obtained by using too much of the accelerator.

Example 2

Beta-naphthol mercaptan was dissolved by gentle heating in samples of alkali refined linseed oil. Representative concentrations of 0.02% to 1% by weight were tested at 300° C., with the following results:

Linseed oil heated to 300° C. in ½ hour and thereafter at 300° C. for 3¾ hours

| Sample | Viscosity: poises at 25° C. |
|---|---|
| Control (no catalyst) | 22.7 |
| Beta-naphthol mercaptan .02% | 36.2 |
| Beta-naphthol mercaptan .075% | 63.4 |
| Beta-naphthol mercaptan .2% | 46.3 |
| Beta-naphthol mercaptan .5% | 27.0 |
| Beta-naphthol mercaptan 1.0% | 17.6 |
| Beta-naphthol mercaptan 5.0% | 3.4 |

Similar tests were made with soya bean oil and tung oil (varnish makers refined grade) at this temperature. It was found that the beta-naphthol mercaptan has the same action on other oils and, in the case of tung oil, that gas-checking is eliminated to a substantial extent.

Example 3

The procedure outlined in Example 2 was repeated at 250° C., using alkali refined linseed oil, tung oil and perilla oil of varnish makers refined grade. The results obtained with linseed oil are shown in the following table:

Linseed oil heated to 250° C. in ½ hour and held at 250° C. for 12 hours

| Sample | Viscosity: poises |
|---|---|
| Control | 12.9 |
| 0.1% | 17.6 |
| 0.2% | 22.7 |
| 0.5% | 36.2 |
| 1.0% | 27.0 |
| 5.0% | 10.7 |

Tre foregoing results indicate that optimum results are obtained when using amounts of catalyst within the range of 0.05% to 0.5% of the oil used, and this range of concentration therefore constitutes a preferred embodiment of the present invention. It was also found that excessive amounts of the catalyst are decidedly harmful in some cases, since a marked reversal of its action at lower concentrations was noted. In other words, kettle bodying in the presence of too much of the catalyst resulted in an oil having a lower viscosity than the control.

The results with thio-paracresol and thiosalicylic acid as indicated in Example 1 show that these materials are also useful catalysts for the kettle bodying of drying and semi-drying oils. We have found that the entire class of aryl mercaptans, as well as some aliphatic mercaptans having sufficiently high boiling points are useful polymerization accelerators or catalysts for this purpose. However, the present application is limited to oil polymerization in the presence of naphthol mercaptans, and particularly beta-naphthol mercaptan in extremely small amounts, since these catalysts are of outstanding commercial utility.

What we claim is:

1. A method of polymerizing drying and semi-drying oils which comprises heating the unpolymerized oils at polymerizing temperatures in the presence of small amounts of beta-naphthol mercaptan.

2. A method of polymerizing drying and semi-drying oils which comprises heating the unpolymerized oils at polymerizing temperatures in the presence of 0.01% to 1.0% by weight of beta-naphthol mercaptan.

3. A method of polymerizing drying and semi-drying oils which comprises heating the unpolymerized oils at polymerizing temperatures in the presence of 0.02% to 0.5% by weight of beta-naphthol mercaptan.

4. A method of polymerizing drying and semi-drying oils which comprises heating the oils at polymerizing temperatures in the presence of a known polymerizing accelerator and 0.01% to 1.0% by weight of beta-naphthol mercaptan.

5. A method of polymerizing drying and semi-drying oils which comprises heating the oils at polymerizing temperatures in the presence of a known polymerizing accelerator and 0.02% to 0.5% by weight of beta-naphthol mercaptan.

6. A composition consisting substantially of drying and semi-drying oils characterized by rapid polymerization when heated to polymerization temperatures and a content of 0.01% to 1.0% by weight of beta-naphthol mercaptan, based on the weight of the oil.

7. A composition consisting substantially of drying and semi-drying oils characterized by rapid polymerization when heated to polymerization temperatures and a content of 0.02% to 0.5% by weight of beta-naphthol mercaptan, based on the weight of the oil.

8. Unpolymerized linseed oil characterized by rapid polymerization when heated to polymerization temperatures having dissolved therein beta-naphthol mercaptan in amounts of 0.01% to 1.0% of the weight of the oil.

9. Unpolymerized linseed oil characterized by rapid polymerization when heated to polymerization temperatures having dissolved therein beta-naphthol mercaptan in amounts of 0.02% to 0.5% of the weight of the oils.

10. A method of polymerizing drying oils which comprises heating the unpolymerized oils at polymerizing temperatures in the presence of a small amount of beta-naphthyl mercaptan.

11. A method of polymerizing linseed oil which comprises heating the unpolymerized oil at polymerizing temperatures in the presence of a small amount of beta-naphthyl mercaptan.

THEODORE F. BRADLEY.
WILLIAM B. JOHNSTON.